(12) United States Patent
Longshaw

(10) Patent No.: US 8,271,452 B2
(45) Date of Patent: Sep. 18, 2012

(54) METHOD, SYSTEM, AND DATABASE ARCHIVE FOR ENHANCING DATABASE ARCHIVING

(75) Inventor: Tom Benjamin Longshaw, Worcestershire (GB)

(73) Assignee: Rainstor Limited, London (GB)

( * ) Notice: Subject to any disclaimer, the term of this patent is extended or adjusted under 35 U.S.C. 154(b) by 629 days.

(21) Appl. No.: 11/451,845

(22) Filed: Jun. 12, 2006

(65) Prior Publication Data

US 2007/0288490 A1   Dec. 13, 2007

(51) Int. Cl.
G06F 7/00  (2006.01)
(52) U.S. Cl. .......................... 707/664; 707/668
(58) Field of Classification Search .................. None
See application file for complete search history.

(56) References Cited

U.S. PATENT DOCUMENTS

| | | | |
|---|---|---|---|
| 5,592,667 A | 1/1997 | Bugajski | |
| 5,963,959 A * | 10/1999 | Sun et al. | 707/200 |
| 6,289,335 B1 * | 9/2001 | Downing et al. | 707/3 |
| 6,493,721 B1 | 12/2002 | Getchius et al. | |
| 6,594,744 B1 * | 7/2003 | Humlicek et al. | 711/162 |
| 6,725,223 B2 | 4/2004 | Abdo et al. | |
| 6,771,843 B1 * | 8/2004 | Huber et al. | 382/305 |
| 6,775,675 B1 | 8/2004 | Nwabueze et al. | |
| 6,981,114 B1 * | 12/2005 | Wu et al. | 711/162 |
| 7,043,485 B2 | 5/2006 | Manley et al. | |
| 2002/0095421 A1 | 7/2002 | Koskas | |
| 2003/0200223 A1 * | 10/2003 | Hack | 707/101 |
| 2004/0172577 A1 * | 9/2004 | Tan et al. | 714/13 |
| 2004/0260900 A1 * | 12/2004 | Burton et al. | 711/162 |
| 2005/0027749 A1 * | 2/2005 | Ohno et al. | 707/200 |
| 2005/0235016 A1 * | 10/2005 | Amano et al. | 707/204 |
| 2006/0106832 A1 | 5/2006 | Ben-Dyke et al. | |
| 2006/0161530 A1 * | 7/2006 | Biswal et al. | 707/3 |
| 2006/0161606 A1 * | 7/2006 | Biswal et al. | 707/204 |
| 2006/0224636 A1 * | 10/2006 | Kathuria et al. | 707/200 |
| 2007/0050333 A1 * | 3/2007 | Vogler | 707/3 |

FOREIGN PATENT DOCUMENTS

WO    WO 02/063498 A1    8/2002

OTHER PUBLICATIONS

Garcia-Molina et al., "Database Systems: The Complete Book", (2002) pp. 909-914, XP002448152.

* cited by examiner

Primary Examiner — Vei-Chung Liang
(74) Attorney, Agent, or Firm — Baker Botts L.L.P.

(57) ABSTRACT

A database archiving method includes storing a plurality of record fields, wherein each of the plurality of record fields is a field of a record of the database, and storing in a first database archive an index that includes at least one record entry, wherein each of the at least one record entry references at least one record field of the database. The plurality of record fields is stored independently of the first database archive, and each field included in more than one record of any single table of the database is stored for the more than one record as a single record field referenced by a plurality of record entries, each of the plurality of record entries corresponding to a different one of the more than one record.

15 Claims, 12 Drawing Sheets

|  | Surname<br>202 | First Name<br>204 | City<br>206 | Age<br>208 |
|---|---|---|---|---|
| Record 201a | Smith | Andrew | Manchester | 40 |
| Record 201b | Wright | Andrew | London | 52 |
| Record 201c | Jones | Andrew | Manchester | 35 |
| Record 201d | Smith | Bob | Gloucester | 52 |
| Record 201e | Bolton | Andrew | Manchester | 40 |
| •<br>•<br>• | | | | |
| Record 201n | Smith | Jim | London | 45 |

Table 200

FIG. 2a

Indices 216

Snapshot(t) 500

| Entry | Pointer | Entered | Deleted |
|---|---|---|---|
| Entry 500a | Pointer 2 | Entered 1/1/00 | NULL |
| Entry 500b | Pointer 3 | Entered 1/3/00 | NULL |
| Entry 500c | Pointer 5 | Entered 1/8/00 | NULL |
| Entry 500d | Pointer 6 | Entered 1/23/00 | NULL |

Snapshot(t +δ) 502

| Entry | Pointer | Entered | Deleted |
|---|---|---|---|
| Entry 502a | *Pointer 2* | NULL | Deleted 2/10/00 |
| Entry 502b | Pointer 3 | NULL | NULL |
| Entry 502c | Pointer 5 | NULL | NULL |
| Entry 502d | Pointer 6 | NULL | NULL |
| Entry 502e | *Pointer 1* | Entered 2/1/00 | Deleted 2/3/00 |
| Entry 502f | Pointer 1 | Entered 2/7/00 | NULL |
| Entry 502g | Pointer 4 | Entered 2/15/00 | NULL |

Snapshot(t + δ + δ) 504

| Entry | Pointer | Entered | Deleted |
|---|---|---|---|
| Entry 504a | Pointer 3 | NULL | NULL |
| Entry 504b | Pointer 5 | NULL | NULL |
| Entry 504c | Pointer 6 | NULL | NULL |
| Entry 504d | *Pointer 1* | NULL | Deleted 3/7/00 |
| Entry 504e | Pointer 4 | NULL | NULL |

FIG. 5

| | | | |
|---|---|---|---|
| Entry 700a | Pointer 2 | NULL | NULL |
| Entry 700b | Pointer 3 | NULL | NULL |
| Entry 700c | Pointer 5 | NULL | NULL |
| Entry 700d | Pointer 6 | NULL | NULL |
| Entry 700e | *Pointer 1* | Entered 2/1/00 | Deleted 2/3/00 |
| Entry 700e | Pointer 1 | Entered 2/7/00 | NULL |

Snapshot(2/8/00) 700

FIG. 7

METHOD, SYSTEM, AND DATABASE ARCHIVE FOR ENHANCING DATABASE ARCHIVING

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method, system, and database archive for enhancing database archiving using a pattern database.

BACKGROUND INFORMATION

Commercial entities record in a database information regarding many facets of matters in which they are involved, e.g., transactions in which they engage. Typically, the entities' internal policies or regulations of governing regulatory bodies aimed at improving the entities' accountability require reporting of such recorded data at particular time intervals or even at any random time. Example regulations are those promulgated in the Sarbanes-Oxley Act of 2002, in particular section 302, and those proposed by Basel II. To comply with such regulations and to enable auditing and investigation of the entities' historic data, the entities archive their databases. Such archiving provides a view of a state of a database at a particular time.

Conventional database archiving methods include backup archiving and incremental archiving, both of which are inefficient with respect to monetary cost, temporal cost with respect to processing time, and/or reliability.

For backup database archiving, a snapshot of a database at a particular time is taken and stored. The snapshot is a copy of the database at the time it was taken. Accordingly, reference to the snapshot provides a view of the database state at that time. Since many such snapshots are required, multiple copies of the database is stored, each providing a snapshot of the database at a different time. The snapshots are usually stored on dismountable media, such as tape. A large database can require tens or hundreds of tapes for a single snapshot, and multiples thereof for more than one snapshot, which is costly. Further, since tape is prone to failure, many entities duplex their snapshots, doubling the cost. Further, much processing time is required for recording the database snapshots. Finally, as new database software releases are produced and implemented by the entities, the entities must continue to support older versions of the database software in order to view the database snapshots stored according to the older database software versions.

Incremental database archiving is implemented to mitigate some of the media costs incurred in storing database snapshots. For incremental database archiving, a single snapshot is stored along with a log of database updates to be applied for obtaining a second snapshot at a second time. Another log of updates from the second time is stored for obtaining a third snapshot at a third time based on (a) the phantom second snapshot which must first be restored based on the first log of updates and (b) the second log of updates, etc. For obtaining a snapshot of the database state at a time subsequent to the time to which a previous snapshot corresponds, the logged updates up to the time of the required snapshot are applied to the previous snapshot. Even this method requires expenditures on a significant amount of the dismountable media for the initial snapshot and the update logs. Further, the probability of failure increases exponentially for each additional incremental update upon which a snapshot is based. If the required snapshot is based on c incremental logs, and the probability of failure of a snapshot based on a single increment of the log is p, then the probability of successfully obtaining the required snapshot is $(1-p)^c$. For example, if there is a 5% probability of media failure for each log increment, and the required snapshot is based on a chain of 10 update log increments, then the probability of successfully obtaining the required snapshot is $0.95^{10}=60\%$.

Accordingly, there is a need in the art for a method, system, and database archive for increasing efficiency of database archiving while complying with internally or governmentally promulgated archiving regulations.

BRIEF DESCRIPTION OF THE DRAWINGS

FIG. 2a is an exemplary table of a database that may include records referenced by multiple indices, according to an example embodiment of the present invention.

FIG. 5 is a diagram that illustrates annotated archive indices that may be used for generating retrospective database archives.

FIG. 7 is a diagram that illustrates a retrospectively generated database archive, according to an example embodiment of the present invention.

DETAILED DESCRIPTION OF EXAMPLE EMBODIMENTS

Embodiments of the present invention provide for a method and system for database archiving that may provide for storing of a plurality of database archives (also referred to herein as "snapshots") in a manner that efficiently uses space of a memory or storage device or medium. A single set of data including elements combinable to form one or more records of a database may be stored. Each, or one or more, of the snapshots may reference the same single set of data. The set of data may include data elements that correspond to individual record fields. The set of data may also include pointers to one or more other data elements of the data set. The one or more other data elements may include other pointers, (for example, intermediate pointers), and/or data elements that correspond to record fields. The set of data may include one or more data elements that correspond to a complete record. The latter data elements may include pointers and/or record field data elements. Each or one or more of the snapshots may include a record index. An index entry may refer to a corresponding one of the latter data elements of the set of data. Accordingly, the record index of a particular snapshot may reference all records of the set of data that pertain to the particular snapshot.

Embodiments of the present invention provide for a database archive or snapshot that includes a record index, on the basis of which a processor may reconstruct a database state as it was at a time to which the snapshot corresponds. The processor may reconstruct the database state by retrieving records from a stored set of data that includes record fields and record identifications. The retrieved records may be those referenced by the record index of the snapshot.

Embodiments of the present invention may be implemented via execution of instructions by a processor to generate and store data elements including record fields and pointers to the record fields and to other such pointers, and to generate and store a plurality of record indices. The data elements including the record fields and pointers may be stored in a first data storage area. The indices may be stored in other data storage areas. Each index entry may refer to a corresponding record by pointing to a location in the first data storage area at which a data element associated with the record is stored. The data element may be a pointer to other data elements that in combination form the record or may include one or more record fields forming the record. The data elements stored at the first data storage area may form a data set that includes all data elements required for constructing all records referenced by the plurality of indices, and that is referred to herein as a "record data set." Multiple indices may reference the same data elements of the record data set. The instructions executed by the processor may be programmed using any conventional programming language.

Figure 1:
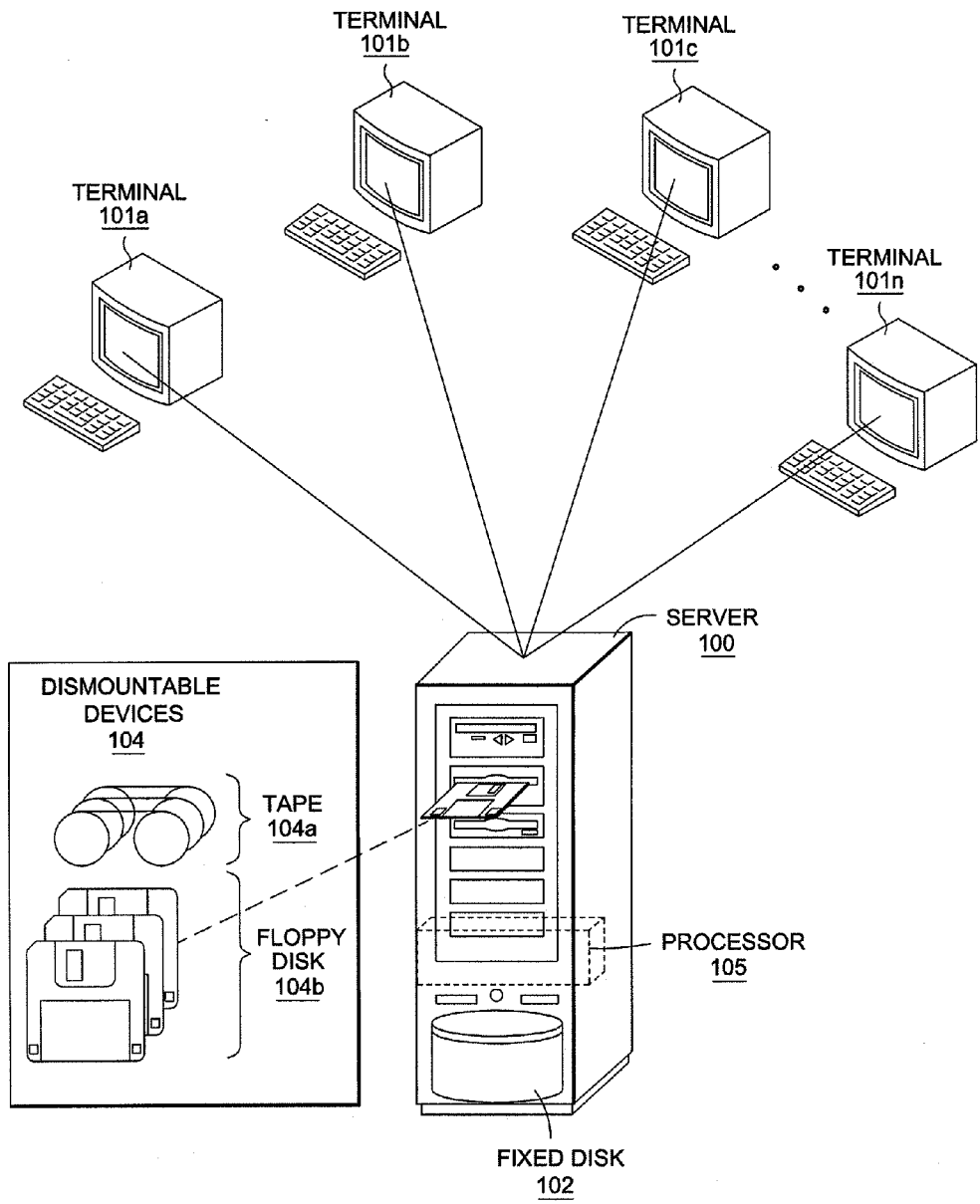
FIG. 1 is a diagram illustrating components of a system, according to an example embodiment of the present invention.

FIG. 1 is a diagram that illustrates components of an example embodiment of the present invention. A record data set of a database may be stored in internal memory or a fixed disk 102. The fixed disk 102 may serve a particular computer terminal, such as a workstation, personal computer (PC), handheld personal digital assistant (PDA), or any other type of microprocessor-based device. Alternatively, the fixed disk 102 may serve a plurality of terminals 101a-n. For example, the fixed disk 102 may be located at a server 100 accessible via a network connection by the plurality of terminals 101a-n. The network may be any conventional network, such as a local area network (LAN), wide area network (WAN), or combination of networks, such as the Internet.

One or more record indices may be stored as corresponding database snapshots. The snapshots may be stored, for example, on dismountable storage devices 104. In this regard, any conventional dismountable storage device may be used. Some examples of the dismountable storage devices 104 are tape 104a and floppy disks 104b. A processor 105, which may be in communication with the fixed disk 102 and/or with the dismountable devices 104 (for example, when a floppy disk 104b is inserted into a disk drive) may generate and store the snapshots. The processor 105 may additionally update a record index representing the database's current state by adding thereto and removing therefrom index entries, and may update the stored record data set in accordance with record updates.

A record index representing a current state of the database may be stored in the fixed disk 102 or in another storage device.

It will be appreciated that other embodiments may be implemented in which different storage mediums than those discussed above are used for storing the record indices and the record data set. For example, in one alternative embodiment, snapshots may also be stored in the fixed disk 102 or another fixed disk. In yet another alternative embodiment, the record data set may be stored on a dismountable device 104.

Figure 2B:
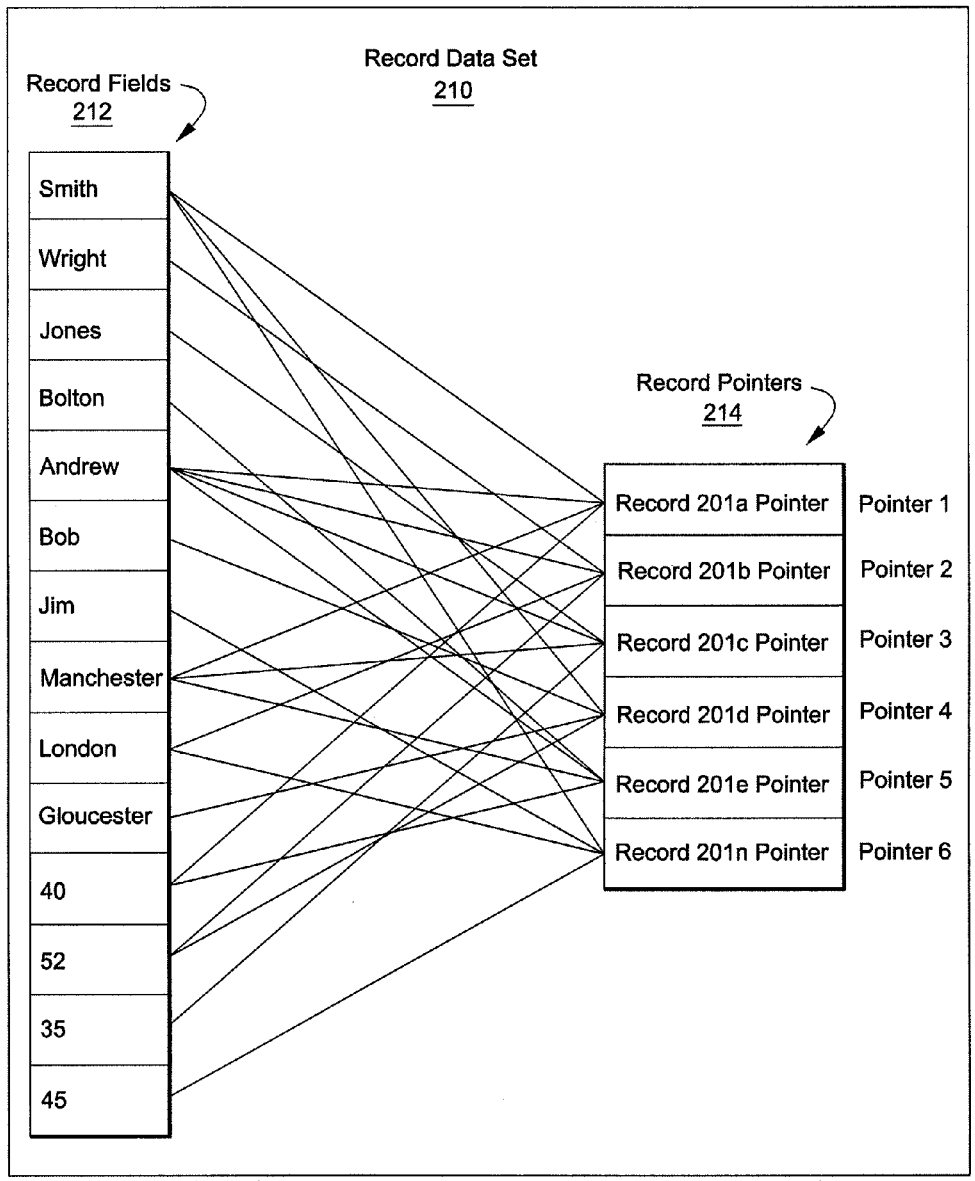
FIG. 2b is a diagram illustrating a record data set including data elements of records of the table of FIG. 2a that may be referenced by multiple indices, according to an example embodiment of the present invention.
Figure 2C:
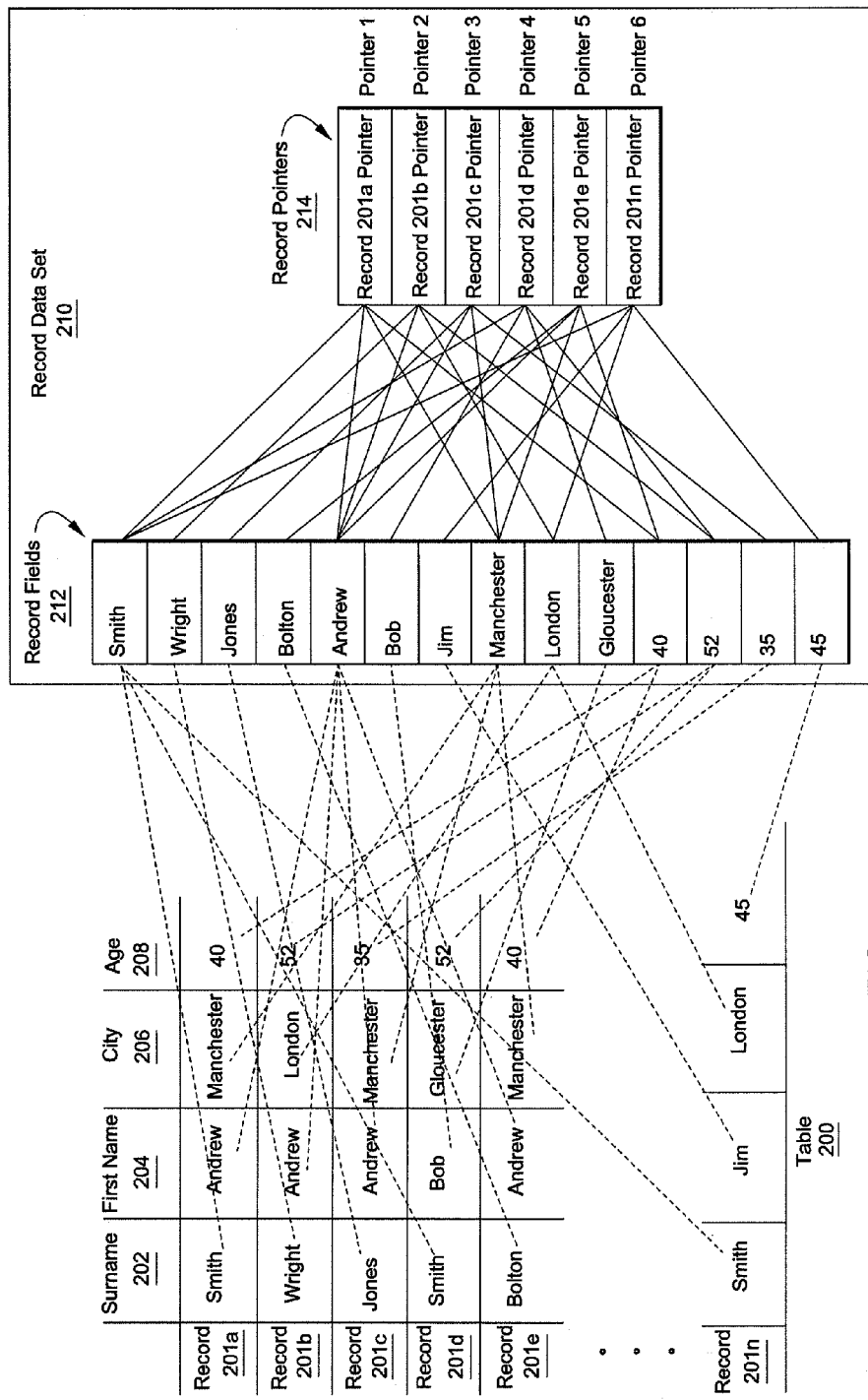
FIG. 2c is a diagram illustrating a relationship between the record data set of FIG. 2b and the table of FIG. 2a, according to an example embodiment of the present invention.
Figure 2D:
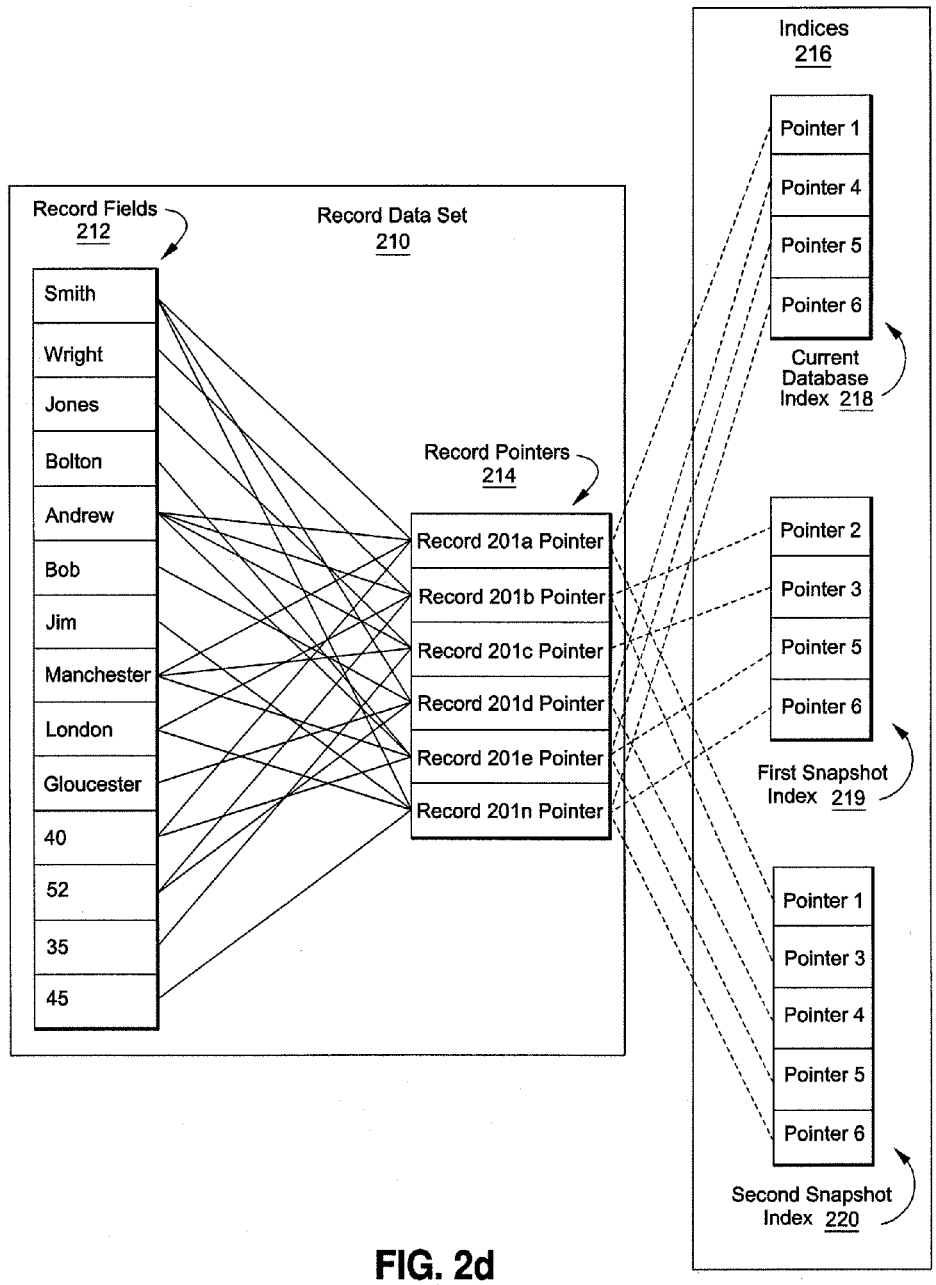
FIG. 2d is a diagram that illustrates a relationship between a record index and the record data set of FIG. 2b, according to an example embodiment of the present invention.

FIG. 2a shows an exemplary table 200 of a database of this type. FIG. 2b is a diagram that illustrates data elements of an exemplary record data set 210 that may be stored in memory, such as the fixed disk 102, and that may be referenced by the record indices. FIG. 2c is a diagram that illustrates an association between a plurality of records of the table 200 and the record data set 210. FIG. 2d is a diagram that illustrates an association between the record data set 210 and the record indices including the snapshot indices and the current database record index.

Referring to FIG. 2a, the table 200 includes records 201a-n, each of which is shown as a row of the table 200. Each record 201 includes a plurality of fields. The fields include surname 202, first name 204, city 206, and age 208. Any two records 201 of table 200 may include for each field category 202-208 different or the same field values, or may include some different field values and some of the same field values. For example, with respect to records 201a and 201b, the field values of fields 202, 206, and 208 are different, but the field values of field 204 are the same.

Record fields of the database, such as those of table 200, may be stored in the fixed disk 102. Alternatively, they may be stored on a dismountable device 104, as discussed above. Although field headings "Surname," "First Name," "City," and "Age" are shown in FIG. 2a, it is not required for the headings to be stored along with the record fields. The record fields may be stored by record. For example, a flat file of sequential data structures, each corresponding to and including all of the fields of a particular one of the records may be stored. According to this embodiment, field values shared by multiple records may be stored multiple times, once for each record. For implementation of embodiments of the present invention, the particular way in which records of the database are stored may be in accordance with any conventional database structure. In one example embodiment of the present invention, the records may be stored as a collection of record fields 212, as shown in FIG. 2b. FIG. 2b illustrates an exemplary record data set 210, which may include the record fields 212 and record pointers 214. The record data set 210 shown in FIG. 2b corresponds to the table 200 of FIG. 2a. Accordingly, each field value of fields 202-208 is shown as a record field 212 in the record data set 210. However, those field values that are fields of multiple records 210 are shown as being stored only once. For example, the field value "Andrew" is stored once, although the table 200 includes 4 "Andrew" record values. A data storage scheme including a combination of the described embodiments may be used. For example, field values shared by multiple records of a single table of the database may be stored once for all of the sharing records, but field values shared by multiple tables of the database may stored multiple times, once for each table.

The record data set 210 may include record pointers 214. Each record pointer 214 may correspond to a particular record of a table of the database. For example, the record pointers 214 shown in FIG. 2*b* correspond to the records 201 of the table 200. Each record pointer 214 may be one or more pointers pointing to the storage location(s) of the fields of the table to which the pointers 214 correspond. For example, the "Record 201*a* Pointer" 214 points to the memory locations of the field values "Smith," "Andrew," "Manchester," and "40," which are the field values of record 201*a* of table 200.

The record data set 210 shown in FIG. 2*b* is shown by way of example only. The set may include sub-pointers, where a pointer of the record data set 210 may point to one or more other pointers, to one or more record fields 212, or to a combination thereof. A record pointer 214 may accordingly point directly to the record fields 212, to other sub-pointers, or to a combination thereof, which ultimately in combination points at least indirectly to all record fields of the record with which the record pointer 214 is associated.

FIG. 2*c* illustrates an association of the records 201*a-n* of table 200 with the stored record fields 212, and the association of the stored record fields 212 with the stored record pointers 214. Accordingly, FIG. 2*c* illustrates the construction of the table 200 based on the record data set 210.

A single record data set 210 may be referred to by a plurality of database indices. Each database index may correspond to a particular state of the database. For example, in a first state, the database may include a first record (or table) and not a second record (or table), but in a second state, the database may include the second record (or table) and not the first record (or table). The record data set 210 may include all of the records and tables, but the database, at a particular point in time, may include only a subset of the record data set 210. FIG. 2*d* shows exemplary indices 216 which include a current database index 218, a first snapshot index 219, and a second snapshot index 220. In an implementation of embodiments of the present invention, more or less indices 216 may be stored. The indices 216 may be stored op one or more dismountable devices 104. Alternatively, they may be stored in the fixed disk 102. They may be stored at a single location or separately at different locations.

The current database index 218 may represent a current state of the database. The first and second snapshot indices 219 and 220 may represent historical states of the database at two different times. The different states of the database may be caused by deletion and/or insertion of records. They may also be caused by updates to records. When a record is updated, the record may be stored in the record data set 210 as two different records, at least where the record is referenced by one index representing a database state in which the record is in its pre-update state and by another index representing a different database state in which the record is in its post-update state.

In an embodiment of the present invention, each database index may include a plurality of pointers, where each pointer points directly or indirectly to a particular one of the database records. For example, in FIG. 2*d*, each index entry includes a pointer to a corresponding one of the record pointers 214 of the record data set 210. Since each record pointer 214 corresponds to a particular record of the database, such that the record may be reconstructed based on the pointer 214, therefore, each index entry similarly corresponds to a particular record of the database. The precise data elements that are stored are shown in FIG. 2*d* by way of example only. For example, as indicated above, instead of field values and pointers, the record data set 210 may instead include a flat file of sequentially listed records, such that an index entry points to record start address of the flat file. The storage space required for storing a snapshot may be substantially less than that required for storing the actual records, since, for each record of the snapshot, it may be that only a single pointer is stored, instead of all of the field values of the record.

With respect to FIG. 2*d*, assuming the indices are shown in reverse chronology, it is shown that a first point in time at which the second snapshot index 220 was generated as a first database archive, the database included records 201*a*, 201*c*, 201*d*, 201*e*, and 201*n*. It is further shown that records 201*a* and 201*d* were deleted and record 201*b* was inserted by a later second point in time at which the first snapshot index 219 was generated as a second database archive. It is further shown that records 201*b* and 201*c* were deleted and records 201*a* and 201*d* were reinserted subsequent to the second point in time, so that the current database state, represented by the current database index 218, includes records 210*a*, 201*d*, 201*e*, and 201*n*.

In an embodiment of the present invention, for generation of a database archive for memorializing a present state of the database, the system may generate a copy of the current database index 218 and may store the copy as the database archive. The copy may provide a snapshot of the present state for reference thereto at a later time, for example, after a change in the state of the database. For example, referring to FIG. 2*d*, the first and second snapshot indices 219 and 220 may be copies of the current database index 218, each copy generated at a different time.

Permanently storing data elements of all records in the record data set, even those that have been deleted may allow for reconstruction of historical database states based on snapshot indices, but may also increase storage costs. A multitude of records may be temporarily inserted, for example, where a record is often updated, such that storage costs may rapidly increase. In an example embodiment of the present invention, at least some of the records, especially temporarily stored records, may be deleted from the record data set. According to this embodiment, all snapshots of the system may be generated by copying the current database index 218. Subsequent to a change in the state of the database reflected by changes in the index entries of the current database index 218, a snapshot of the database state prior to the state change may no longer be generable. According to this embodiment, when the system receives an instruction to delete a record entry from the database, or receives an instruction to update a record entry which may include a delete of the record entry from the current database index 218 and an insert of another record entry as the updated record entry, the system may determine whether the record corresponding to the deleted entry is referenced by any previously generated database snapshot. If it is determined that the deleted record entry is not referenced by any snapshot, the system may delete the record from the record data set 210. It is noted that the particular time when the system performs this check is not limited to then time when a delete instruction is received, but may be instead performed at any time. For example, the system may check for and delete non-referenced records periodically, in response to a user-instruction, and/or when a snapshot is generated.

Consider the preceding embodiment as applied to an exemplary installation in which record data elements are stored as shown in FIG. 2b. Each record pointer 214 may include an extra bit for indicating whether the record is referenced by a snapshot. When a record is first inserted, the bit may be unset, e.g., set to 0. When a snapshot is generated, the extra bit of each record pointer 214 that is referenced by the current database 218 at the time of the snapshot generation may be set, e.g., set to 1. Further, each record field 212 may include data indicating a number of records to which the field 212 belongs. For example, record field 212 "Smith" may include data indicating that it is a field of three records (records 210a, 201d, and 201n). This number may be incremented each time a record pointer 214 that references the same field value is entered and may be decremented each time a record pointer 214 that references the field value is deleted. The same principle may be applied to intermediate pointers (not shown), which may be treated as record fields 212 with respect to the entering and deletion of record pointers 214 that reference the intermediate pointers and which may be treated as record pointers 214 with respect to incrementing and decrementing the use numbers of record fields 212 referenced by the intermediate pointers. For the latter, a decrement of the use count of an intermediate pointer may be treated as a deletion in response to which use count of a referenced field 212 is decremented. When the system receives the instruction to delete a record entry, the system may remove the record entry from the index, and remove the record pointer 214 corresponding to the deleted record entry if the bit is unset. The system may decrement the use count of each record field 212 pointed to by the deleted record pointer 214 and may delete from the record data set 210 any record field 212 the count of which has been decremented to 0, indicating that it is not a field of any existing record. Accordingly, records temporarily inserted and not referenced by any database index may be removed from the record data set 210 to free up storage space.

In a variant of the preceding example embodiment, a single record pointer 214 may be referenced multiple times by a single database index. For example, a table may include two records that are identical with respect to all record fields. Instead of saving two record pointers 214, the single record pointer 214 may be referenced by two index entries, so that construction of the table based on the index entries provides the two identical records. Accordingly, if the system receives an instruction to delete a record entry from the database, it may be required for the system to maintain the record data elements in the record data set 210 even if the extra bit of the record pointer 214 is unset, since the current database index may include another entry that references the same record pointer 214. Therefore, when a delete instruction (or update instruction including a delete instruction) is received, the system may additionally traverse the current database index 218 to determine whether the index includes another entry referencing the same record pointer 214. If another such entry is found, the record pointer 214 may be maintained.

Alternatively, similar to other record data elements, a use count may be provided for the record pointers 214. The use count may be provided in addition to or instead of the extra bit. For example, in the former case, the extra bit may be used to determine whether a record pointer 214 is referenced by any snapshot index, the use count may be provided to indicate the number of times the record pointer 214 is referenced by the current database index, and the record pointer 214 may be deleted from the record data set 210 if both the extra bit is unset and the use count is set to 0. In the latter case, the use count may indicate the number of times the record pointer 214 is referenced by any index entry of any index. For example, if the record pointer 214 is referenced twice by the current database index and its use count is set to 2, then during a snapshot generation, the system may increment the use count to 4. Accordingly, when the record entry is deleted from the current database index 218, the system may delete the record pointer 214 from the record data set 210 if its use count is decremented to 0 by the entry deletion.

Even if multiple record pointers 214 are stored for multiple record entries of a single index that refer to identical record fields, it may still be required for the system to traverse the current database index 218 prior to deletion of a record pointer 214 from the record data set 210, if the deletion is performed, e.g., during a periodic procedure, in response to an instruction to check for non-referenced record data elements, or during a snapshot generation. Contrary to an instance where performance of record deletion is in response to an entry deletion, in which case it is therefore known that the entry is not included in the current database index 218, if the record deletion is performed at another time, whether the entry is included in the current database index 218 might not be known. However, as discussed above, traversal of the index may be replaced by decrementing of a use count associated with the record pointer 214, which may be provided in addition to or instead of the extra bit.

According to the embodiment in which the current database index 218 is traversed when the delete is performed at a time other than an index entry delete, instead of separately traversing the current database index 218 for each record pointer 214, e.g., that is not referenced by a snapshot index, the system may traverse the current database index 218 once and note which record pointers 214 are referenced by the index 218. The system may then delete from the record data set 210 all other record pointer 214 that are also not referenced by any snapshot index as indicated by the extra bit.

According to the embodiments discussed above, in which generation of all snapshots may be performed by copying the current database index 218, such that a snapshot of the database state at a time prior to a change in the current database index 218 may not be generable, for modification of the current database index 218 in response to a record update, the system may overwrite an entry to be deleted with the inserted record, instead of deleting the entry representing the initial version of the record and appending to the end of the index the new entry representing the updated version of the record. This procedure may be performed, for example, where it is desirable maintain an order in which records were entered into the database. Since the newly inserted entry does not represent a new record, but instead represents an updated version of a previously entered record, the new record entry may be placed at the location at which was placed the previous entry representing the initial version of the previously entered record. A slight modification of the procedure for update of the current database index 218 responsive to a record update may be implemented for other embodiments of the present invention, as will be discussed in detail below.

Figure 3:
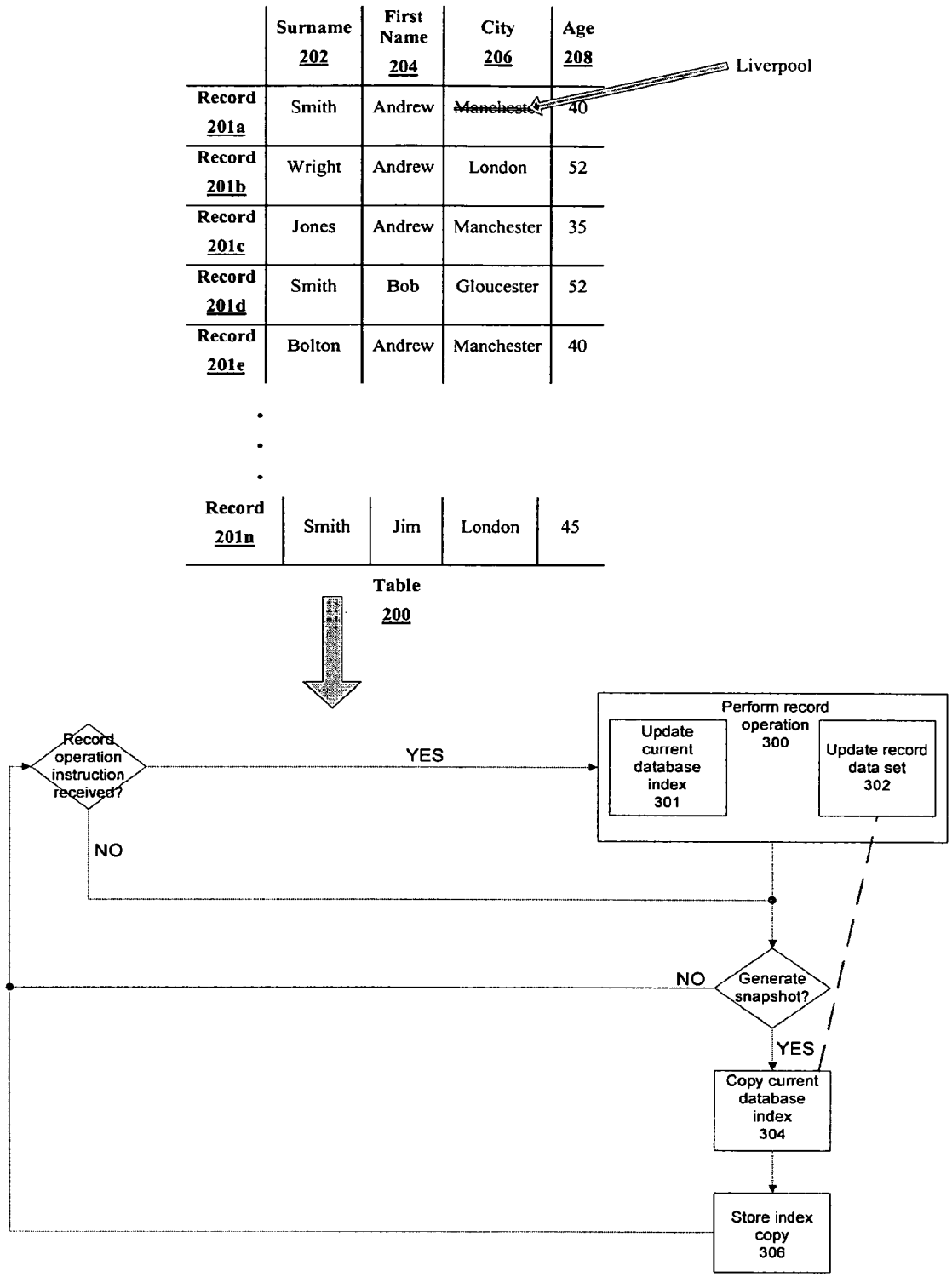
FIG. 3 is a flowchart that illustrates a procedure by which to generate and maintain a database and database archives, according to an example embodiment of the present invention.

FIG. 3 is a flowchart that illustrates a procedure by which to generate and maintain a database and database archives according to an example embodiment of the present invention. At 300, record operations may be performed. The operations, e.g., performed in response to user instructions, may include a record insert operation, a record delete operation, and/or a record update operation, for changing a state of the database. For example, a database table may be provided in an interactive form at a user interface, e.g., a graphical user interface (GUI), via which a user may indicate changes to the table, in response to which the system may perform the record operations at 300. For example, 300 may be performed in response to deletion by a user of "Manchester" from record 201*a* of table 200, and insertion of "Liverpool" in its place.

For performance of the record operations, the system may, at 301, update the current database index 218, and/or may, at 302, update the record data set 210. As discussed above, 301 may include insertion and/or deletion of a record entry from the current database index 218, and 302 may include insertion and/or deletion of a record or record element from the record data set 210. Further, as discussed above, 302 may be performed independently of 300, e.g., periodically, for removal of unused record data elements from the record data set 210.

At 304, which may be performed, for example, periodically and/or in response to user instruction for generation of a snapshot, the system may copy the current database index 218. At 306, the system may store the index copy as a database archive, for example, with metadata indicating the date and/or time of the copy, i.e., the time at which the database was in the state represented by the archive. In one embodiment of the present invention, approximately concurrent with performance of 304-306, the system may perform 302 independently of 300. However, 302 is not required for generation of the database archive. 302 may be performed for conserving storage space. Subsequent to performance of 300 if a snapshot is not to be generated, and subsequent to performance of 304-306 and/or 302, the system may again wait for an instruction to perform a record operation or for a next time to generate a database archive.

According to embodiments discussed above, database snapshots of the currently existing state of the database may be generated periodically or in response to user instruction. However, it might not be practical, e.g., with respect to processor time and memory limitations, to generate a database snapshot at every instant. It may therefore occur, according to some embodiments of the present invention, that a desired snapshot of the database state at a particular time is unavailable, if a snapshot was not generated at the particular time. In an alternative example embodiment of the present invention, even subsequent to a change in the state of the database reflected by changes in the index entries of the current database index 218, a snapshot of the database state prior to the state change may be generable. According to this embodiment, database snapshots may be generable, for example, for representing a state of any time since database inception.

For retrospective snapshot generation, the system may store a plurality of update logs indicating performed record operations. Each update log may correspond to a particular generated snapshot, (or to the current database index 218 in an embodiment in which the current database index 218 is maintained as a mirror of an active database with which a user interacts, as will be discussed below). Each update log may include log entries indicating record operations performed for changing the database state from a first state existent at the time represented by the snapshot to which the log corresponds to a second state existent at a time represented by a following snapshot, or, where no subsequent snapshot had been generated, indicating all record operations performed since the time represented by the snapshot to which the log corresponds.

In an embodiment of the present invention, each record operation entry may be separately annotated with a timestamp to indicate the date and/or time of its operation. In an alternative embodiment, where a single transaction includes a plurality of operations, the transaction may be annotated instead of each of the constituent operation entries. A transaction may be that which includes two or more operations that are treated as a single unit so that a snapshot either reflects both operations or otherwise neither of them. For example, a transaction may be a transfer of money between accounts that includes a first operation to update a balance of a first account and a second operation to update a balance of a second account.

Figure 4:
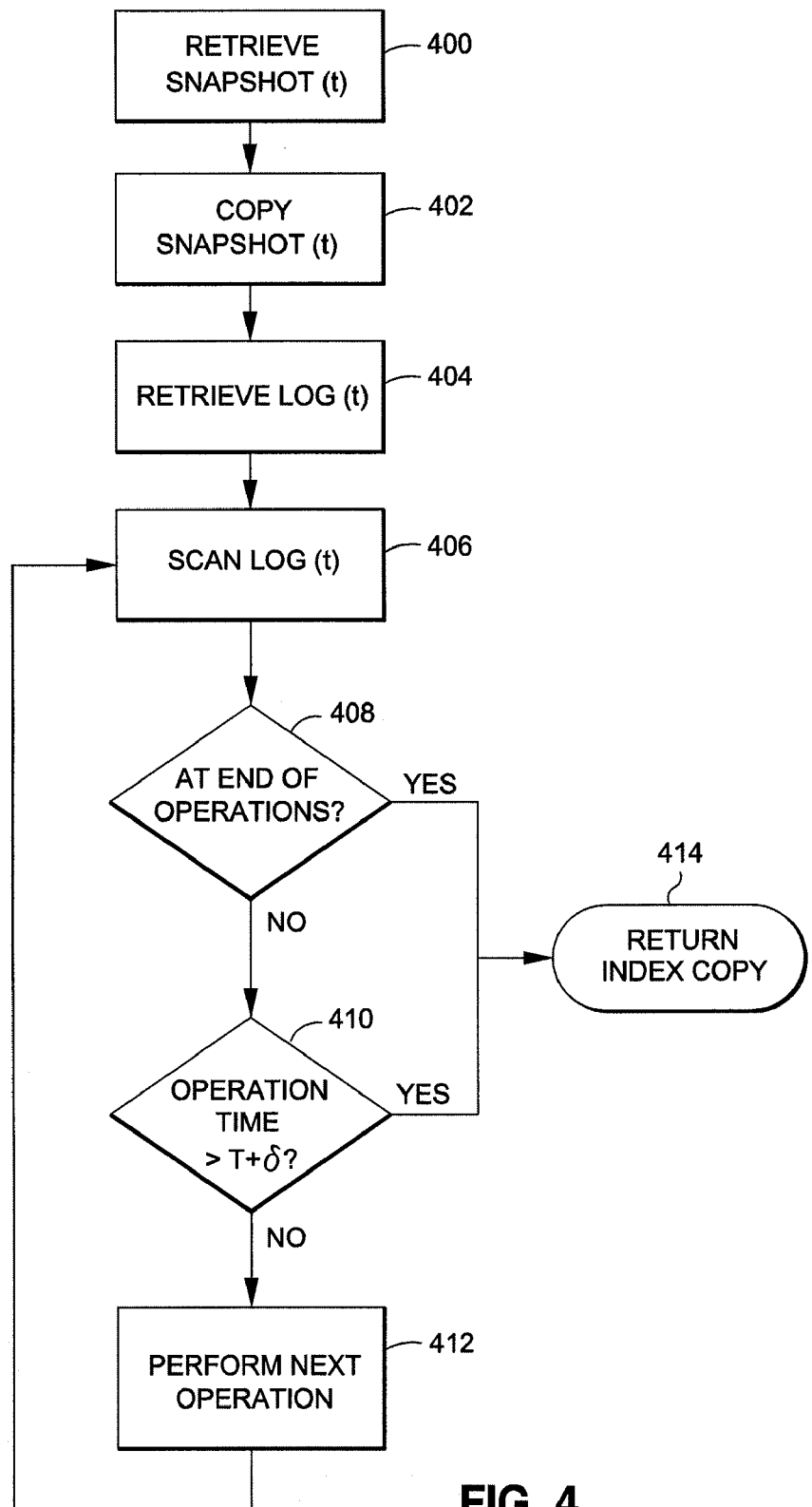
FIG. 4 is a flowchart that illustrates a procedure by which to generate retrospective database archives based on non-retrospective archives and a record operations log, according to an example embodiment of the present invention.

Based on a log and the particular snapshot to which the log (or current database index) corresponds, a snapshot of the database state at a time (t+δ) ("snapshot(t+δ)") subsequent to the particular time (t) to which the particular snapshot ("snapshot(t)") corresponds, and, if a snapshot corresponding to a time subsequent to the particular time was previously generated, prior to the subsequent time, may be generated, for example, according to a procedure represented by a flowchart illustrated in FIG. 4.

In response to a triggering event, such as receiving a user instruction to generate a snapshot of a database state at a past time, the system may perform the procedure represented by the flowchart illustrated in FIG. 4. At 400, the system may retrieve snapshot(t). At 402, the system may generate a copy of snapshot(t). At 404, the system may retrieve log(t), (the log corresponding to snapshot(t)). At 406, the system may scan the log(t) for entries of record operations. It is noted that if no record operations were performed since time t, it may occur that no log(t) is available or that a NULL log is available. In the former instance, the system may perform 414 immediately following 404. In the latter instance, 406 may be performed.

At 408, the system may determine whether there are any further entries in the log. If the system determines that there are no other entries, i.e., that the system has reached the end of the operations entered in the log(t), the system may proceed to 414. For example, if the log(t) is a NULL log, the system may proceed to 414 without performing 410-412, since at the first instance of performing 408, the system may determine that the end of operations has been reached.

If, at 408, the system determines that the end of operations has not been reached, the system may determine, at 410, whether the time with which the next entry of the log(t) is annotated is a time later than t+δ. If the indicated time is subsequent to t+δ, in which case the entry's record operation is not applicable to snapshot(t+δ), the system may proceed to 414. Otherwise, the system may, at 412, perform the entry's operation, i.e., change the index of the snapshot(t) copy to reflect the record operation. The record data set 210 need not be changed since the same record data elements may be provided for multiple snapshots, where different snapshots may reference different record data elements of the record data set 210. Subsequent to 412, the system may return to 406.

If the system determines that the end of operations has been reached (at 408) or that the next entry's annotated time is later than t+δ, the system may perform 414, at which the system may return the snapshot(t) copy as the snapshot(t+δ). The returned copy may reflect all record operations, if any, that have occurred since time t up to and including time t+δ.

Although a plurality of update logs is discussed, the plurality of update logs may be a single update log, portions of which, that are non-fixedly demarcated according to time periods, may be considered separate logs. For example, if the system uses snapshot(t) to generate snapshot(t+δ), the system may use as the log(t) a log portion including entries annotated with timestamps indicating times subsequent to time t and up to and including time t+δ.

Storing the update logs may result in substantial cost with respect to required memory space. Furthermore, repeating the procedure of FIG. 4 for each retrospectively generated snapshot may cause substantial cost with respect to processor time and resources. An alternative example embodiment of the present invention may provide for retrospective snapshot generation, where there is less memory and processor cost. According to the alternative embodiment, instead of storing indices 216 and record operation logs corresponding to the indices, the system may annotate index entries to indicate times of entry into the index or time of removal from the database state.

For example, the index entries of a snapshot(t+δ) may include entries representing records of the database state represented by the snapshot(t+δ) and entries representing records of the database state represented by a snapshot(t) on the basis of which the snapshot(t+δ) was generated. The index entries may be annotated with a timestamp indicating a time of entry or deletion.

FIG. 5 shows examples indices generated according to this embodiment. A first snapshot(t) 500, for example, generated by copying the current database index 218, may include entries having pointers to data elements of the record data set 210. For each entry, the system may annotate the entry with a timestamp indicating date and/or time of its entry. A second snapshot(t+δ) 502, generated based on snapshot(t) 500, may include entries having pointers to data elements of the record data set 210. Further, in one example embodiment of the present invention, the same pointer may be included in a plurality of its entries if a record operation for inserting a record is performed subsequent to a prior record operation for deleting the record. The subsequent record operation for inserting the record may be treated as an insertion of a new record, rather than a reinstatement of an old record. Accordingly, index entries 502e and 502f indicate that the record that may be reconstructed by retrieval of the data elements pointed to by pointer 1 was entered on Feb. 1, 2000, deleted on Feb. 3, 2000, and re-entered on Feb. 7, 2000.

In an embodiment of the present invention, if an entry of snapshot(t+δ) was also included in snapshot(t) on which generation of snapshot(t+δ) was based, then the system may provide the entry in snapshot(t+δ) without a timestamp indicating its date and/or time of entry. For example, entries 502a, 502b, 502c, and 502d of snapshot(t+δ) 502 do not include timestamps indicating their dates of entry, since they were included in snapshot(t) 500. Accordingly, lack of a time-of-entry timestamp for an entry of a snapshot(t+δ) may imply that the entry was already included in a previous snapshot(t) upon which generation of the snapshot(t+δ) was based Similarly, in an embodiment of the present invention, if an entry of a snapshot(t+δ) includes a timestamp indicating its deletion, the entry may be omitted from a snapshot(t+δ+δ) generated based on the snapshot(t+δ). For example, snapshot (t+δ+δ) 504 does not include an entry including the pointer 2 since between Feb. 10, 2000 (prior to time t+δ) and time t+δ+δ, a record corresponding to pointer 2 was not included in a state of the database. Accordingly, omission of an entry in a snapshot(t+δ+δ) generated based on a snapshot(t+δ) may imply that the entry was not included in any state of the database between the times of t+δ and t+δ+δ.

According to an example embodiment of the present invention, the system may store a log of record operations performed since an immediately preceding non-retrospectively generated snapshot. Based on a non-retrospectively generated snapshot(t) and the log of operations performed since time t, the system may, at time t+δ, non-retrospectively generate a snapshot(t+δ) based on the snapshot(t) and the log. The snapshot(t+δ) may include the entries and timestamps discussed above, for example, as shown in FIG. 5. Subsequent to generation of the snapshot(t+δ), the log of record operations performed since time t may be discarded. A new log of record operations performed since time t+δ may be maintained in its stead, for example until a subsequent non-retrospective snapshot generation at time t+δ+δ.

In an alternative embodiment of the present invention, the system may keep track of record operations performed between non-retrospective snapshot generations without maintaining a log. Instead, approximately immediately following a non-retrospective snapshot generation at time t, the system may remove from the current database index 218 all entries indicated to have been deleted and may remove all timestamps of the remaining entries. In response to record operations, the system may annotate the remaining entries of the current database index 218 and add entries to the index (including timestamps) in accordance with the record operations performed since the time of the last non-retrospective snapshot generation. At time t+δ, the system may copy the current database index 218 to generate the snapshot(t+δ).

Figure 6:
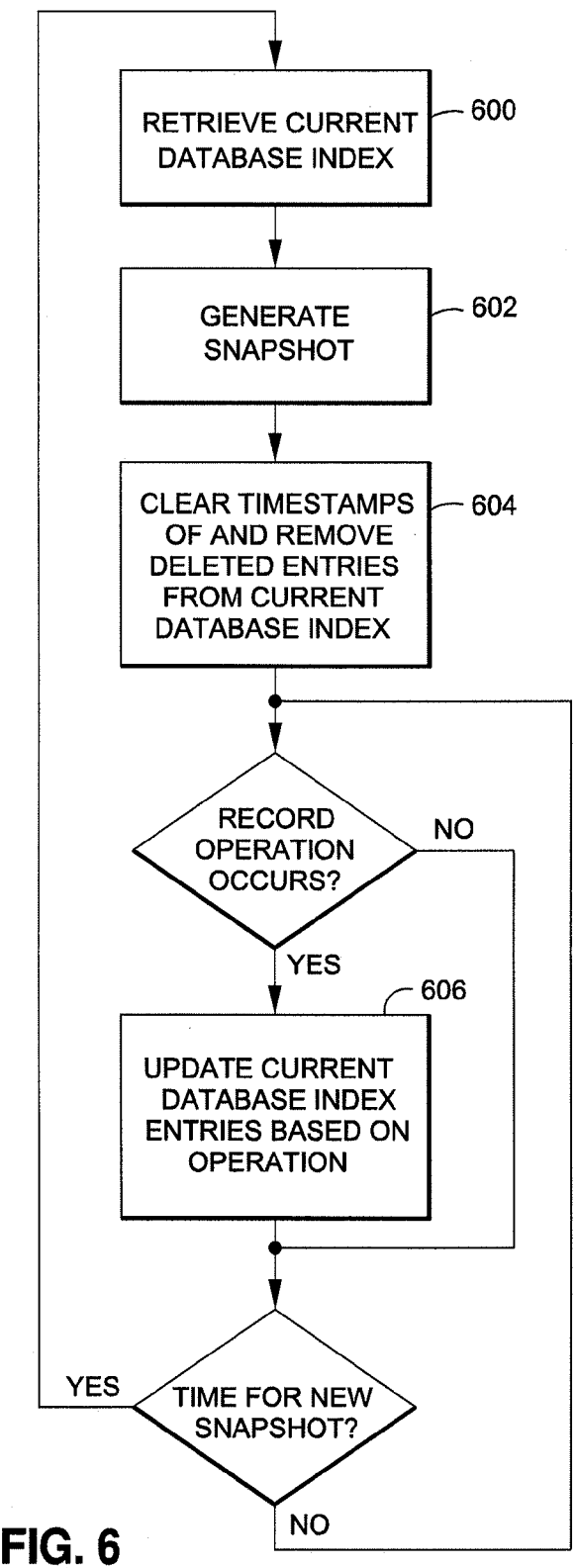
FIG. 6 is a flowchart that illustrates a procedure by which to maintain and update a current database index that may be used for generation of non-retrospective database archives, which may, in turn, be used for generation of retrospective database archives, according to an example embodiment of the present invention.

For example, referring to FIGS. 5 and 6, at time t, the system may, at 600, retrieve the current database 218. The system may, at 602, copy and save the current database index 218 to generate the snapshot(t) 500. At 604, the system may delete all time-of-entry timestamps from the current database index 218 and may remove from the current database index 218 all entries indicated to have been deleted. After the snapshot generation procedure, including update of the current database index 218 is complete, the system may wait for record operations. If a record operation occurs, the system may, at 606, update the current database index 218 to include a new entry and/or a new timestamp. When the next time for non-retrospectively generating a snapshot arrives, the system may return to 600. Otherwise, the system may continue to wait for record operations.

Before any non-retrospective snapshot is generated, e.g., from the time of database inception until a first non-retrospective snapshot is generated, the system may maintain and update the current database index 218 as described with respect to FIG. 6. In response to each record operation, the system may update the current database index 218.

According to this embodiment, deletion of an entry from the current database index 218 does not necessarily result in removal of the entry from the index 218. Instead, deletion of an entry may occur by insertion of a timestamp indicating a time of a deletion operation with respect to the entry, while maintaining the entry in the index 218. Further, as is discussed above, an operation for update of a record may include a deletion and an insertion. However, since, according to this embodiment, an entry of a deleted record may be maintained in the current database index 218, in response to an update operation, the system may modify a previous entry for the record to include a time-of-deletion timestamp, and may add another entry to the index. As discussed above, it may be desirable to maintain an order in which records were entered into the database. Accordingly, the new entry entered in response to an update operation may be placed by the system in an index position immediately following the position of the deleted (but maintained) entry of the update operation.

According to the embodiments in which the snapshots and/or the current database index 218 are annotated to include timestamps, e.g., as shown in FIG. 5, a snapshot representing a state of the database at a time t may be retrospectively generated. The snapshot corresponding to time t may be generated based on a previously generated snapshot that represents a time subsequent to time t and that is closest in time to time t compared to times to which corresponds any other previously generated snapshot that represents a time subsequent to t.

For example, for retrospectively generating a snapshot representing the database state at Feb. 8, 2000 ("snapshot(2/8/

2000)"), if, of all non-retrospectively generated snapshots corresponding to times after Feb. 8, 2000, snapshot(t+δ) 502 represents a time closest to Feb. 8, 2000, the system may generate snapshot(2/8/2000) based on snapshot(t+δ) 502. FIG. 7 shows an example snapshot(2/8/2000) 700 that may be generated based on snapshot(t+δ) 502. With respect to entry 502a, since it is indicated that the entry was entered before time t (to which snapshot(t) 500 corresponds), which is prior to Feb. 8, 2000 (known because otherwise snapshot(t) 500 would have been selected as the basis for the generation of snapshot 700) and was deleted on Feb. 10, 2000, which is after Feb. 8, 2000, the pointer 2 may be entered into snapshot 700 with no timestamps, indicating that the entry (700a) is not deleted and was entered prior to a previous time to which a previously generated snapshot (snapshot(t) 500) corresponds.

Subsequently, either the snapshot 700 or the snapshot 502 may be used for generation of a snapshot representing a state of the database on Feb. 6, 2000, depending on a selected rule set. For example, in one embodiment, the system may provide for retrospective generation of a snapshot by selecting from only those previously generated snapshots that were non-retrospectively generated. In an alternative embodiment, the system may provide for selection of even a previously retrospectively generated snapshot. According to the former embodiment, the system may omit timestamps from retrospectively generated snapshots, since they would not be of use if the snapshot cannot be the basis for another retrospectively generated snapshot. This may be desirable for conservation of storage costs.

If no snapshot corresponds to a time subsequent to time t, the snapshot corresponding to time t may be generated based on the current database index 218 (according to the embodiment in which the current database index 218 is annotated), or based on the log as applied to the preceding non-retrospectively generated snapshot if any, or otherwise based on the log alone (according to the embodiment in which a log of record operations between non-retrospectively generated snapshots is maintained).

According to embodiments of the present invention that provide for retrospective snapshot generation, in an example embodiment of the present invention, the system may permanently store in the record data set 210 even those record data elements that are temporarily entered, e.g., such that none of the generated indices 216 refer to the record data elements. For example, the system may permanently store all record data elements that had been stored in the record data set 210 at any time. Although such permanent storage of non-referenced data elements may increase storage costs, such permanent storage may be required so that a snapshot representing a database state in which the data elements were included in database records may be retrospectively generated and used for reconstructing the database state represented by the snapshot.

Organizations often invest heavily in database technology and may be reluctant to replace legacy database technology in which they have already invested with newer database technology. In an example embodiment of the present invention, the system may provide for implementing database archiving in parallel with such legacy technology. Mirroring may be implemented for maintaining a mirror of a database of the legacy technology, where the mirror is configured to include a record data set and a current database index. Generated snapshots may be indices that reference the record data elements of the record data set of the mirror.

For generation of the database mirror, any commercially available mirroring product may be used in conjunction with a filter that accepts feeds from the mirroring product and that uses the feeds for generating the record data set and indices, and for updating the indices. The filter may implement the interface of the mirroring product such that the filter may be in place of a database mirror to which the product would otherwise write. The filter may use these feeds to generate a log of record operations (record inserts, deletes, and/or updates) reflecting the operations of the feeds. Based on the log, the mirror including the record data elements of the record data set and the current database index 218 may be generated and updated. Alternatively, in an example embodiment of the present invention, in place of a conventional mirroring agent and a filter, a replication agent may be constructed for accepting feeds directly from the legacy database technology and generating the log of record operations (record inserts, deletes, and/or updates) based on the feeds. For example, the replication agent may add triggers to the legacy database technology for providing the feeds, or may implement a process to read a log file of the legacy database technology.

Figure 8:
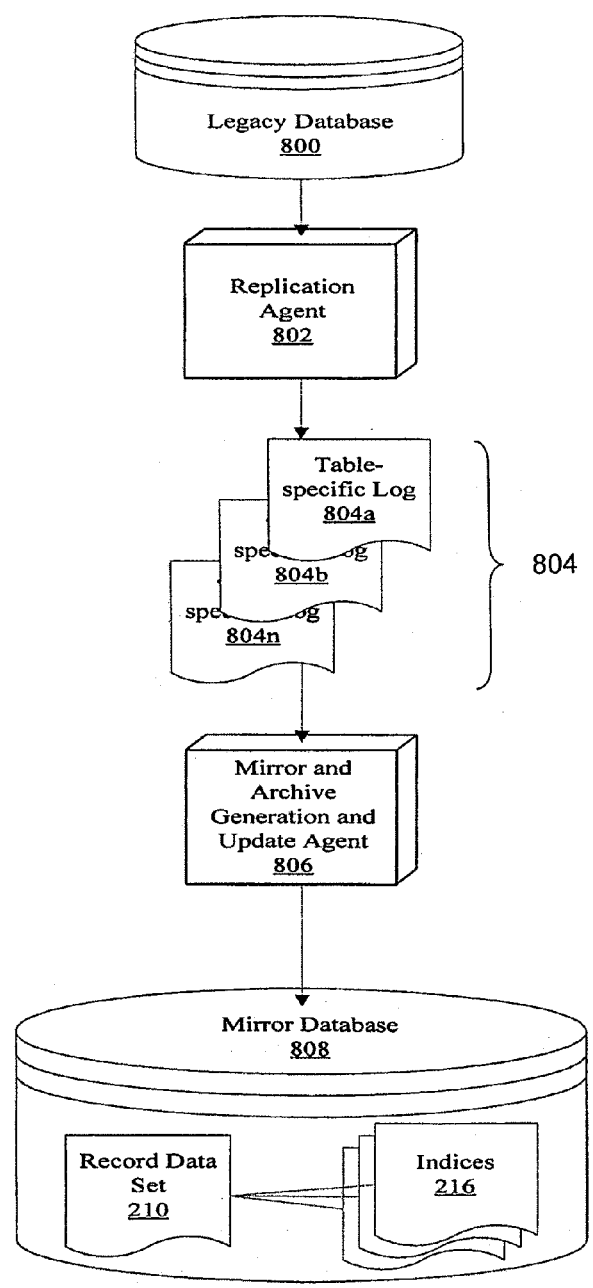
FIG. 8 is a block diagram that illustrates components of a system for generating a mirror of a legacy database and for generating database archives, according to an example embodiment of the present invention.

FIG. 8 is a block diagram that illustrates components of an example embodiment of the present invention for generating a mirror of a legacy database that may be used for generating and storing database archives (snapshots) in accordance with the embodiments discussed above. A replication agent 800 may accept feeds from a legacy database 800. Based on the feeds, the replication agent 800 may generate a record operations log 804. The log 804 may include a plurality of logs 804a-n, each for a different table of the database, as is discussed in detail below. A mirror and archive generation and update agent 806 may retrieve or receive the log 804. Based on the log, the mirror and archive agent 806 may update the record data set and the current database index set 216 as discussed in detail above. The mirror and archive agent 806 may also generate snapshots according to the methods discussed in detail above. According to this embodiment, the current database index 216 may represent a most current mirrored state, rather than a most current active state with which a user interacts.

In one example embodiment of the present invention, the mirror and archive agent 806 may perform batched generation of multiple snapshots. For example, the agent 806 may be configured to generate snapshots for each three day period, but may update the mirror database 808 less frequently than every 3 days, or may have otherwise received snapshot generation requests more frequently than the frequency at which the agent 806 updates the mirror database 808. The agent 806 may accordingly queue snapshot generation requests (automatically or manually entered), and may generate all requested snapshots at the next mirror database update.

Figure 9:
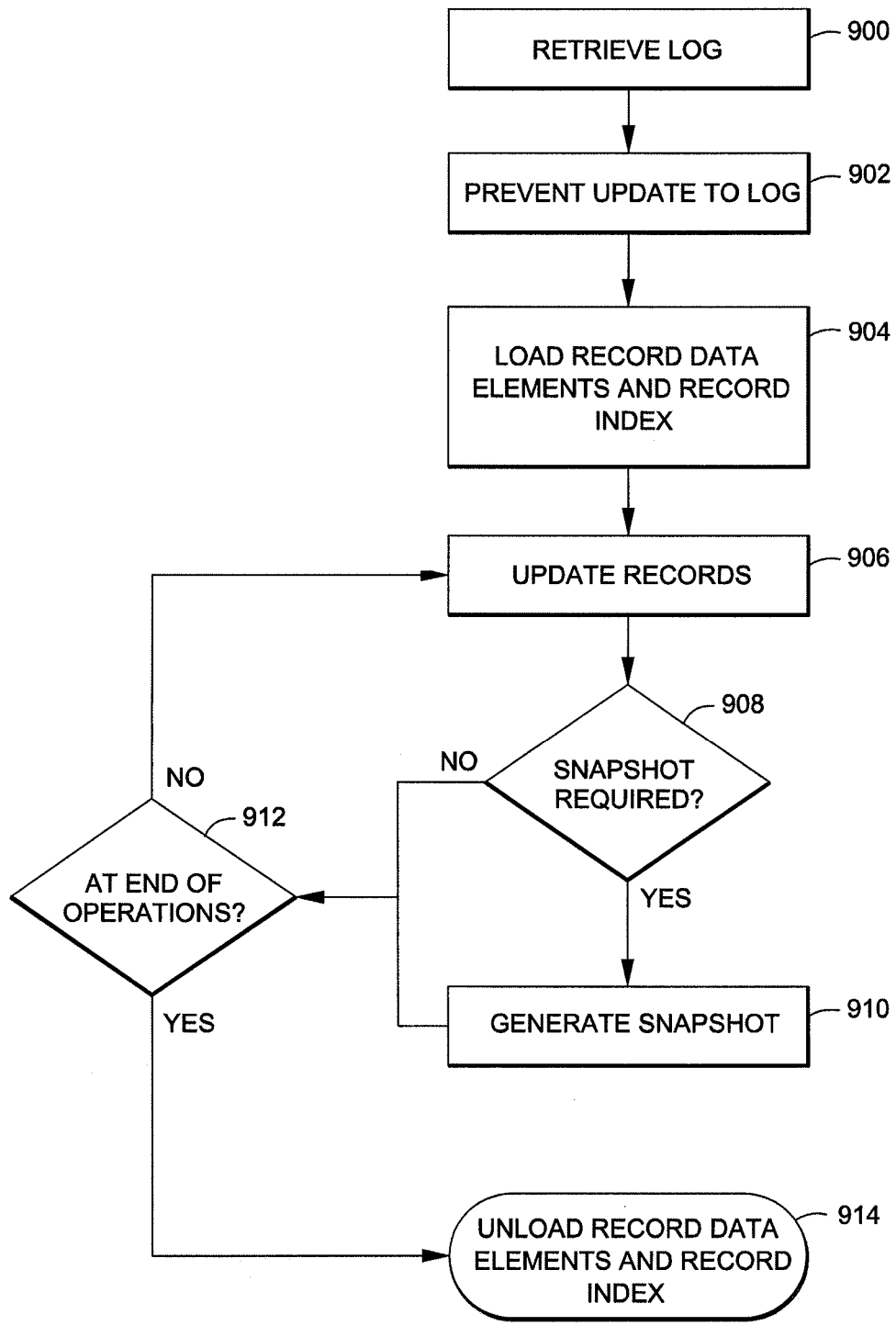
FIG. 9 is a flowchart that illustrates a procedure by which to generate a legacy database mirror and database archives, according to an example embodiment of the present invention.

FIG. 9 is a flowchart that illustrates a procedure that may be performed by the agent 806 according to an example embodiment of the present invention. At 900, the agent 806 may retrieve the log 804. At 902, the agent 806 may prevent further update to the log 804 on the basis of which the agent 806 updates the mirror database 808, e.g., by locking the log 804 as read-only or by copying the log 804 and working with the copy rather than the original. If the log 804 is locked as read-only, then the replication agent 802 may queue feeds from the legacy database 802 until the log 804 is unlocked. At 904, the agent 806 may load the record data elements and the current database index 216 into memory. At 906, the agent 806 may apply changes to the record data elements, e.g., insertion of new record data elements, deletion of record data elements, and/or use count updates, and to the current database index 218. At 908, the agent 806 may determine whether a snapshot is required. Whether a snapshot is required may be determined based on the timestamp of the previous operation according to which the mirror database 808 was updated and time to which a requested snapshot, if any, is to correspond. If it is determined that a snapshot is to be generated, the agent 806 may, at 910, generate the requested snapshot. Otherwise, and also subsequent to 910 if 910 is performed, the agent may, at 912, determine whether there are any further entries in the log, i.e., whether the end of logged operations has been reached. If there are additional entries, the agent 806 may proceed again to 906. Otherwise, the procedure may end by unloading the record data elements and the current database index at 914.

In an alternative embodiment of the present invention, all changes may first be applied, and then all requested snapshots may be generated. However, since the current database index 216 may correspond to a time later than a time to which a requested snapshot is to correspond, it may be required for the current database index 218 to annotated with timestamps as discussed in detail above.

In another alternative embodiment, the mirroring updates may be performed very frequently so that more than one snapshot request is not queued between updates. According to this embodiment, the agent 806 may apply all updates, may then perform 910, and may omit performance of 912.

In another alternative embodiment of the present invention, the mirroring updates and the snapshot generations may be performed as separate procedures. However, if a snapshot request, for example, for representation of a current state of the database, is received subsequent to a latest mirroring update, the request may be queued until the next mirroring update.

With respect to a database structure according to which a single data element is stored in the record data set for multiple records, e.g., record field "Smith" of FIG. 2, which is stored for records 201*a*, 201*d*, and 201*n*, the order in which the record fields are read from memory may be different than the order in which they appear in the particular records to which they correspond. For example, record field "Andrew" may be at a completely different location than "Jones," even though they are both of record 201*c*, since "Andrew" may have initially been stored for record 201*a*, and then referenced, too, for record 201*c*. Accordingly, while applying changes to the record data set at 906, the order in which the record data elements are read may be in an almost random order compared to the order in which they form parts of particular records (although it is not actually random, since there is a logic to the way in which they are stored and read). For such databases, a strategy for their storage to and retrieval from the fixed disk 102 may be difficult. It may therefore be desirable to, at 904, load the record data elements from the fixed disk 102 to primary memory. However, the number of record data elements that may be concurrently loaded to primary memory may be limited. Therefore, in an example embodiment of the present invention, the system may, at 904, load the record data elements into primary memory a table at a time, and perform updates to the record data elements a table at a time. For example, with respect the procedure represented by the flowchart of FIG. 9, the procedure may be performed separately for each log 804*a-n*. At 900, the system may retrieve a single one of the logs 804*a-n* for performance of the procedure. According to this embodiment, where the snapshot generation is integrated with the mirroring operation, the system may generate a snapshot piecemeal, i.e., table by table snapshot indices.

According to the embodiments that provide for retrospective snapshot generation by applying changes to a previously generated snapshot based on a corresponding log, according to an example embodiment of the present invention, different portions of the retrospective snapshot corresponding to different tables may be separately generated based on corresponding portions of the previously generated snapshot and the corresponding logs 804*a-n*.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A database archiving method, comprising:
storing a plurality of record fields, wherein each of the plurality of record fields is a field of a record of a database;
storing in a first database archive an index that includes at least one record entry, wherein:
   each of the at least one record entry references at least one record field of the database;
   the plurality of record fields is stored independently of the first database archive;
   each field included in more than one record of any single table of the database is stored for the more than one record as a single record field referenced by a plurality of record entries, each of the plurality of record entries corresponding to a different one of the more than one record; and
   each of the plurality of record fields is referenceable by (a) at least one of a plurality of database archives and (b) a current database index;
modifying a current database index that, for representation of a current state of the database, references one or more of the plurality of record fields by at least one of deleting from the current database index, inserting into the current database index, or updating in the current database index a representation of a record, wherein:
   deleting the representation of the record includes one of (a) removing from the current database index a record entry corresponding to the record or (b) annotating the record entry corresponding to the record to indicate deletion of the record;
   inserting the representation of the record includes inserting into the current database index the record entry corresponding to the record and annotating the record entry corresponding to the record to indicate its time of entry; and
   updating the representation of the record includes at least one of (a) removing from the current database index the record entry corresponding to the record and inserting a new record entry in place of the removed record entry or (b) annotating the record entry corresponding to the record to indicate the record's deletion and inserting the new record entry immediately following the record entry corresponding to the record;
copying the current database index to obtain the index of the first database archive;
subsequent to the copying of the current database index, removing from the current database index each record entry that is annotated to indicate the record's deletion and clearing all time of entry annotations;
retrieving one of a second database archive and the current database index; and based on record entry annotations of the one of the second database archive and the current database index, generating the index of the first database archive.

2. The method of claim 1, wherein at least one of the plurality of record fields is a field of more than one record.

3. The method of 1, wherein:
the at least one record field is referenced by each of the at least one record entry either directly or indirectly; and
a record field is referenced indirectly by a reference of a record entry to a record data element that references the record field.

4. The method of claim 3, wherein the record data element references more than one record field.

5. The method of claim 1, further comprising:
maintaining a record field in storage upon a condition that the record field is referenced by at least one of (a) at least one of the plurality of database archives or (b) the current database index.

6. The method of claim 5, further comprising:
allotting, for each record field and for each group of record fields forming a record, a corresponding bit to indicate whether the record field is referenced by any of the plurality of database archives; one of:
for each record field, during generation of the record field, setting the record field's corresponding bit to a first value;
for each group, during generation of the group, setting the group's corresponding bit to the first value; or
for each of the plurality of database archives, during generation of the database archive, one of:
setting, for each record field referenced by the database archive, the record field's corresponding bit to a second value if not previously set to the second value; or
setting, for each group referenced by the database archive, the group's corresponding bit to the second value if not previously set to the second value;
and one of:
removing a particular record field from storage upon a condition that the corresponding bit of the particular record field is set to the first value and the particular record field is not referenced by the current database index; or
removing a particular group from storage upon a condition that the corresponding bit of the particular group is set to the first value and the particular group is not referenced by the current database index.

7. The method of claim 1, wherein:
the first database archive is associated with a time t; and
a particular record entry of the one of the second database archive and the current database index is included in the first database archive upon a condition that the one of the second database archive and the current database index indicates that a record to which the particular record entry corresponds was part of a state of the database at time t.

8. The method of claim 1, further comprising:
storing a log of record operations; and
for generation of the first database archive:
retrieving a copy of a second database archive generated prior to generation of the first database archive; and
modifying the copy of the second database archive in accordance with the log;
wherein, subsequent to the modification of the copy, the copy is stored as the first database archive.

9. The method of claim 8, wherein:
the modification includes:
inserting a new record entry into the copy if the log indicates one of an insert operation and an update operation; and
removing a record entry from the copy of the log indicates one of a deletion operation and the update operation.

10. The method of claim 9, wherein:
a state of the database at a particular time is reconstructible based on the first database archive;
each entry of the log includes a time of a corresponding logged record operation;
modification of the copy based on a particular record operation indicated by the log is made upon a condition that the particular record operation is associated by the log with a time that is one of at and earlier than the particular time.

11. The method of claim 10, wherein:
the database includes a plurality of tables;
the log includes a plurality of logs, each log corresponding to a different one of the plurality of tables;
the second database archive includes a plurality of index portions, each portion corresponding to a different one of the logs; and
modifying the copy includes separately modifying each index portion of the copy according to its corresponding log.

12. The method of claim 8, further comprising:
for generation of a third database archive associated with a time t that is prior to a time with which the first database archive is associated:
retrieving a copy of the first database archive;
for each record entry of the copy, removing from the record entry from the copy if and upon a condition that the first database archive indicates that a record to which the record entry corresponds was not part of a state of the database at the time t; and
subsequently storing the copy as the third database archive.

13. The method of claim 12, wherein a record entry of the first database archive is included in the third database archive if and upon a condition that:
(A) the record entry of the first database archive is one of:
(a) associated with a time-of-deletion timestamp that one of (i) indicates a time subsequent to time t and (ii) is NULL; and
(b) not associated with a time-of-deletion timestamp; and
(B) the record entry of the first database archive is one of:
(a) associated with a time-of-entry timestamp that one of (i) indicates a time one of at and earlier than the time t and (ii) is NULL; and
(b) not associated with a time-of-entry timestamp.

14. The method of claim 13, wherein the first database archive is used as a basis for generating the third database archive upon a condition that of all previously generated database archives associated with times subsequent to time t, the time with which the first database archive is associated is closest to time t.

15. One or more non-transitory computer-readable storage media embodying logic that is operable when executed to:
store a plurality of record fields, wherein each of the plurality of record fields is a field of a record of a database;
store in a first database archive an index that includes at least one record entry, wherein:

each of the at least one record entry references at least one record field of the database;

the plurality of record fields is stored independently of the first database archive;

each field included in more than one record of any single table of the database is stored for the more than one record as a single record field referenced by a plurality of record entries, each of the plurality of record entries corresponding to a different one of the more than one record; and each of the plurality of record fields is referenceable by (a) at least one of a plurality of database archives and (b) a current database index;

modify a current database index that, for representation of a current state of the database, references one or more of the plurality of record fields by at least one of deleting from the current database index, inserting into the current database index, or updating in the current database index a representation of a record, wherein:

deleting the representation of the record includes one of (a) removing from the current database index a record entry corresponding to the record or (b) annotating the record entry corresponding to the record to indicate deletion of the record;

inserting the representation of the record includes inserting into the current database index the record entry corresponding to the record and annotating the record entry corresponding to the record to indicate its time of entry; and updating the representation of the record includes at least one of (a) removing from the current database index the record entry corresponding to the record and inserting a new record entry in place of the removed record entry or (b) annotating the record entry corresponding to the record to indicate the record's deletion and inserting the new record entry immediately following the record entry corresponding to the record;

copy the current database index to obtain the index of the first database archive;

subsequent to the copying of the current database index, remove from the current database index each record entry that is annotated to indicate the record's deletion and clearing all time of entry annotations;

retrieve one of a second database archive and the current database index; and based on record entry annotations of the one of the second database archive and the current database index, generate the index of the first database archive.

\* \* \* \* \*